J. E. SMITH.

COMBINED HAT HOLDER AND CHECK.

No. 6,796. Reissued Dec. 14, 1875.

Witnesses

Chas. H. Smith

Harold Sewell

Inventor

John E. Smith.

per Lemuel W. Serrell atty.

N. PETERS, PHOTO-LITHOGRAPHER, WASHINGTON, D. C.

UNITED STATES PATENT OFFICE.

JOHN E. SMITH, OF WATERBURY, CONNECTICUT, ASSIGNOR TO THE SMITH AND GRIGGS MANUFACTURING COMPANY.

IMPROVEMENT IN COMBINED HAT HOLDERS AND CHECKS.

Specification forming part of Letters Patent No. 102,982, dated May 10, 1870; reissue No. 6,796, dated December 14, 1875; application filed October 28, 1875.

*To all whom it may concern:*

Be it known that I, JOHN E. SMITH, of Waterbury, in the county of New Haven and State of Connecticut, have invented an Improvement in Combined Hat-Holder and Check, of which the following is a specification:

Clamps for grasping various articles have been made of two jaws, and a lever or slide for forcing such jaws together. Clamps of this kind have been used for holding clothes, and for tools and watch-work.

My device is made especially for grasping and holding the brim of a hat, whereby the same can be suspended; and I apply to the same a removable check, so that the article can be identified, the said clamp and check having corresponding letters or numbers.

Figure 1:
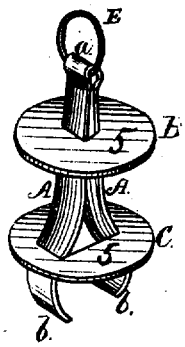
Figure 2:
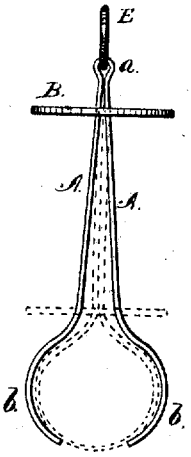
Figure 3:
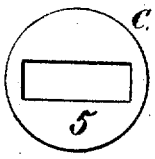

In the drawing, Figure 1 is a perspective view of the said clamp and check. Fig. 2 is side elevation of the clamp, and Fig. 3 is a detached view of the check.

The clamp is made of a strip of sheet metal, bent in the middle at *a* to form a loop for the ring E, and the side pieces A A are bent toward each other, and terminate as jaws *b b*.

The ring B is adapted to slide upon the clamp A, and when moved toward the ring E the jaws open, in consequence of the spring of the sheet metal; and when the ring B is moved toward the jaws *b* said jaws are closed, to clamp the article placed between them.

The removable check C may be made with a mortise or opening through it, so as to be passed upon the jaws and held by their expansion. This check is to have a mark or number corresponding to the clamp. In the drawing the number 5 is shown.

When the clamp is to be used upon a hat the check C is disconnected, and the hat grasped at the brim or otherwise between the jaws, and the owner of the hat receives the check, so as to indicate his own hat.

This device is especially useful at places of amusement, hotels, &c.

The check, for convenience, may be slipped upon the ends of the clasp, as seen in Fig. 1, when the clamp is not in use.

I am aware that a clamp has been made of a folded piece of metal, having buttons with teeth attached to the inner portions of the ends, to form a suspender-fastening.

In my holder the ends of the strip of metal are turned up to form the clamping jaws, and to dispense with the said buttons.

I claim as my invention—

1. The clasp made of a strip of metal, folded to form the loop *a*, and the ends bent toward each other to form the jaws *b*, in combination with the suspending-ring E and sliding ring B, substantially as set forth.

2. The removable check C, in combination with the clasp A *b*, and sliding ring B, substantially as specified.

Signed by me this 20th day of October, 1875.

JOHN E. SMITH.

Witnesses:

G. S. WILLIAMS,

A. F. ABBOTT.